(12) United States Patent
McCubbrey

(10) Patent No.: US 8,230,374 B2
(45) Date of Patent: Jul. 24, 2012

(54) METHOD OF PARTITIONING AN ALGORITHM BETWEEN HARDWARE AND SOFTWARE

(75) Inventor: David L. McCubbrey, Ann Arbor, MI (US)

(73) Assignee: Pixel Velocity, Inc., Ann Arbor, MI (US)

( * ) Notice: Subject to any disclaimer, the term of this patent is extended or adjusted under 35 U.S.C. 154(b) by 887 days.

(21) Appl. No.: 11/957,287

(22) Filed: Dec. 14, 2007

(65) Prior Publication Data

US 2008/0148227 A1 Jun. 19, 2008

Related U.S. Application Data

(60) Continuation of application No. 11/432,186, filed on May 10, 2006, now Pat. No. 7,587,699, which is a division of application No. 10/441,581, filed on May 19, 2003, now Pat. No. 7,073,158.

(60) Provisional application No. 60/381,295, filed on May 17, 2002, provisional application No. 60/869,949, filed on Dec. 14, 2006.

(51) Int. Cl.
*G06F 17/50* (2006.01)
(52) U.S. Cl. .................. 716/116; 716/101; 716/105
(58) Field of Classification Search .................. 716/101, 716/105, 116
See application file for complete search history.

(56) References Cited

U.S. PATENT DOCUMENTS

| | | | |
|---|---|---|---|
| 5,307,168 A | 4/1994 | Tashiro | |
| 5,452,239 A | 9/1995 | Dai et al. | |
| 5,841,439 A | 11/1998 | Pose et al. | |
| 5,912,980 A | 6/1999 | Hunke | |
| 6,006,276 A | 12/1999 | Maccormack et al. | |
| 6,086,629 A | 7/2000 | McGettigan et al. | |
| 6,097,429 A | 8/2000 | Seeley et al. | |
| 6,301,695 B1 | 10/2001 | Burnham et al. | |
| 6,370,677 B1 | 4/2002 | Carruthers et al. | |
| 6,373,851 B1 | 4/2002 | Dadario | |
| 6,396,535 B1 | 5/2002 | Waters | |
| 6,438,737 B1 | 8/2002 | Morelli et al. | |
| 6,457,164 B1 | 9/2002 | Hwang et al. | |
| 6,526,563 B1 | 2/2003 | Baxter | |
| 6,557,156 B1 | 4/2003 | Guccione | |
| 6,561,600 B1 | 5/2003 | Seeley et al. | |
| 6,625,743 B1 | 9/2003 | Gulick | |
| 6,668,312 B2 * | 12/2003 | Aubury | 711/170 |

(Continued)

FOREIGN PATENT DOCUMENTS

WO 03041411 A 5/2003

(Continued)

OTHER PUBLICATIONS

PC/104 Specification Version 2.5 Nov. 2003, PC/104 Embedded Consortium.

(Continued)

*Primary Examiner* — Thuan Do
(74) *Attorney, Agent, or Firm* — Jeffrey Schox

(57) ABSTRACT

A method of partitioning an algorithm between hardware and software includes accepting a user defined algorithm specified in a source code, identifying worker methods and feature extraction methods within the user defined algorithm, replacing worker methods in the source code with hardware logic, replacing feature extraction methods with a combination of hardware logic and software libraries that interface with the hardware logic, and outputting an FPGA programming specification of the hardware logic and interface libraries.

16 Claims, 2 Drawing Sheets

U.S. PATENT DOCUMENTS

| | | |
|---|---|---|
| 6,754,882 B1 | 6/2004 | Sanchez et al. |
| 6,757,304 B1 | 6/2004 | Nomura et al. |
| 6,785,352 B1 | 8/2004 | Ranta |
| 6,798,344 B2 | 9/2004 | Faulkner et al. |
| 6,894,809 B2 | 5/2005 | Nims et al. |
| 6,970,183 B1 | 11/2005 | Monroe |
| 6,985,620 B2 | 1/2006 | Sawhney et al. |
| 7,015,954 B1 | 3/2006 | Foote et al. |
| 7,054,491 B2 | 5/2006 | Mcguinness et al. |
| 7,072,504 B2 | 7/2006 | Miyano et al. |
| 7,073,158 B2 | 7/2006 | McCubbrey |
| 7,106,374 B1 | 9/2006 | Bandera et al. |
| 7,231,065 B2 | 6/2007 | Peach et al. |
| 7,386,833 B2 * | 6/2008 | Granny et al. ............ 717/109 |
| 7,394,916 B2 | 7/2008 | Brodsky et al. |
| 7,451,410 B2 | 11/2008 | McCubbrey |
| 7,511,764 B2 | 3/2009 | Cooper et al. |
| 7,551,203 B2 | 6/2009 | Nakayama et al. |
| 7,587,699 B2 | 9/2009 | Mccubbrey |
| 7,620,266 B2 | 11/2009 | Brown et al. |
| 7,817,207 B2 | 10/2010 | Sung |
| 8,063,929 B2 | 11/2011 | Kurtz et al. |
| 2001/0046316 A1 | 11/2001 | Miyano et al. |
| 2003/0025599 A1 | 2/2003 | Monroe |
| 2003/0052966 A1 | 3/2003 | Trinkel et al. |
| 2003/0062997 A1 | 4/2003 | Naidoo et al. |
| 2003/0086300 A1 | 5/2003 | Noyes et al. |
| 2003/0095711 A1 | 5/2003 | Mcguinness et al. |
| 2003/0098913 A1 | 5/2003 | Chang |
| 2003/0101426 A1 | 5/2003 | Sarkinen et al. |
| 2003/0160980 A1 | 8/2003 | Olsson et al. |
| 2003/0193577 A1 | 10/2003 | Doring et al. |
| 2003/0217364 A1 | 11/2003 | Polanek et al. |
| 2004/0061780 A1 | 4/2004 | Huffman |
| 2004/0095374 A1 | 5/2004 | Jojic et al. |
| 2004/0130620 A1 | 7/2004 | Buehler et al. |
| 2004/0135885 A1 | 7/2004 | Hage |
| 2004/0233983 A1 | 11/2004 | Crawford et al. |
| 2004/0240542 A1 | 12/2004 | Yeredor et al. |
| 2004/0252193 A1 | 12/2004 | Higgins |
| 2004/0252194 A1 | 12/2004 | Lin |
| 2004/0263621 A1 | 12/2004 | Guo et al. |
| 2005/0073585 A1 | 4/2005 | Ettinger et al. |
| 2005/0073685 A1 | 4/2005 | Arai |
| 2005/0165995 A1 | 7/2005 | Gemelli et al. |
| 2005/0185053 A1 | 8/2005 | Berkey et al. |
| 2005/0190263 A1 | 9/2005 | Monroe et al. |
| 2005/0212918 A1 | 9/2005 | Serra et al. |
| 2005/0275721 A1 | 12/2005 | Ishii |
| 2006/0007242 A1 | 1/2006 | Hill et al. |
| 2006/0020990 A1 | 1/2006 | Mceneaney |
| 2006/0028552 A1 | 2/2006 | Aggarwal et al. |
| 2006/0149829 A1 | 7/2006 | Kuan |
| 2006/0171453 A1 | 8/2006 | Rohlfing et al. |
| 2006/0174302 A1 | 8/2006 | Mattern et al. |
| 2006/0187305 A1 | 8/2006 | Trivedi et al. |
| 2006/0197839 A1 | 9/2006 | Senior et al. |
| 2006/0215765 A1 | 9/2006 | Hwang et al. |
| 2006/0227138 A1 | 10/2006 | Oizumi |
| 2006/0252521 A1 | 11/2006 | Gururajan et al. |
| 2006/0252554 A1 | 11/2006 | Gururajan et al. |
| 2007/0024706 A1 | 2/2007 | Brannon et al. |
| 2007/0065002 A1 | 3/2007 | Marzell et al. |
| 2007/0098001 A1 | 5/2007 | Thomas |
| 2007/0104328 A1 | 5/2007 | Sung |
| 2007/0247525 A1 | 10/2007 | Samarasekera et al. |
| 2007/0250898 A1 | 10/2007 | Scanlon et al. |
| 2007/0258009 A1 | 11/2007 | Kanda et al. |
| 2007/0279494 A1 | 12/2007 | Aman et al. |
| 2008/0019566 A1 | 1/2008 | Niem et al. |
| 2008/0036864 A1 | 2/2008 | Mccubbrey et al. |
| 2008/0074494 A1 | 3/2008 | Nemethy et al. |
| 2008/0096372 A1 | 4/2008 | Demand et al. |
| 2008/0133767 A1 | 6/2008 | Birrer et al. |
| 2008/0148227 A1 | 6/2008 | Mccubbrey |
| 2008/0151049 A1 | 6/2008 | Mccubbrey et al. |
| 2008/0211915 A1 | 9/2008 | Mccubbrey |
| 2008/0297587 A1 | 12/2008 | Kurtz et al. |
| 2009/0086023 A1 | 4/2009 | Mccubbrey |
| 2011/0115909 A1 | 5/2011 | Sternberg et al. |

FOREIGN PATENT DOCUMENTS

| | | |
|---|---|---|
| WO | 2007095526 A | 8/2007 |
| WO | 2008103850 A | 8/2008 |
| WO | 2011060385 A | 5/2011 |

OTHER PUBLICATIONS

PC/104 Specification Version 2.0 Nov. 2003, PC/104 Embedded Consortium.

PC/104 Specification Version 2.5 Nov. 2003.

PC/104-Plus Specification Version 2.0 Nov. 2003.

* cited by examiner

METHOD OF PARTITIONING AN ALGORITHM BETWEEN HARDWARE AND SOFTWARE

CROSS-REFERENCE TO RELATED APPLICATIONS

This application is a continuation of prior application Ser. No. 11/432,186, filed May 10, 2006, which is a division of prior application Ser. No. 10/441,581, filed 19 May 2003 and entitled "Automated system for designing and developing field programmable gate arrays", now U.S. Pat. No. 7,073,158, which claims the benefit of U.S. Provisional Application No. 60/381,295 filed 17 May 2002 and entitled "Automated System for Designing and Developing Field Programmable Gate Arrays." All three applications are incorporated in their entirety by this reference.

This application also claims the benefit of U.S. Provisional Application No. 60/869,949 filed on 14 Dec. 2006 and entitled "Liquid Gates Algorithm Compiler", which is also incorporated in its entirety by this reference.

TECHNICAL FIELD

This invention relates generally to the programmable hardware field, and more specifically to a new and useful method of partitioning an algorithm between hardware and software.

BACKGROUND

The development and implementation phase of transferring a high-level user-specified image-processing algorithm to an FPGA is considered to be very challenging to even the most experienced engineers and designers. This challenge is increased when partitioning an image processing sequence across multiple FPGAs. Thus, there is a need in the programmable hardware field to create a new and useful method of partitioning an algorithm between hardware and software. This invention provides such a new and useful method.

DESCRIPTION OF THE PREFERRED EMBODIMENTS

The following description of preferred embodiments of the invention is not intended to limit the invention to these preferred embodiments, but rather to enable any person skilled in the art to make and use this invention.

Figure 1:
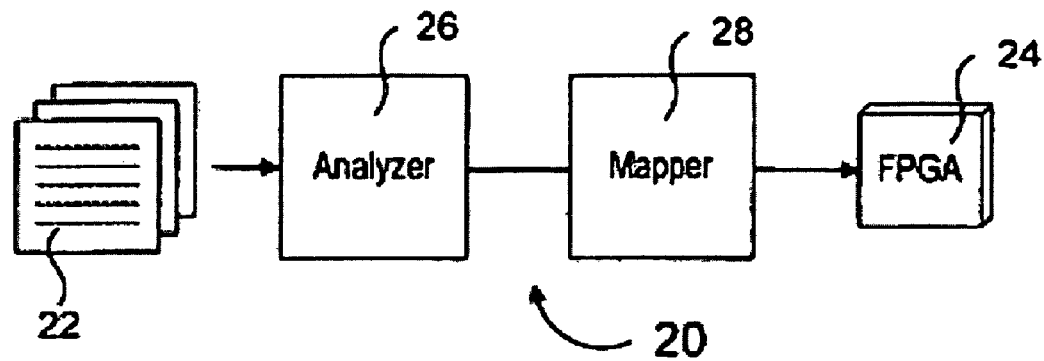
FIGS. 1 and 2 are simplified block diagrams representing the system and method, respectively, of the preferred embodiment of the invention.

As shown in FIG. 1, a system 20 designed according to this invention for automatically converting an algorithm from a source code 22 to a field programmable gate array 24. The source code 22 describes the intended operation of the eventual FPGA 24. The arrangement includes an analyzer module and a mapper module 28 that automatically analyze the source code 22 and provides a mapping and arrangement of the necessary components to be implemented on the FPGA 24.

The analyzer module 26 in one example uses standard compiler technology to parse the language of the source code 22. In most situations, the source code 22 will be in a high-level language such as C++, which is capable of specifying parallelism at the source code level through object types. Of course, this invention is not limited to any particular computer language used to develop the source code 22. The analyzer module 26 processes the source code 22 to identify vector elements (e.g. images) within the source code and to provide a dataflow graph that indicates the overall vector processing flow and operation sequence within the source code 22. (The dataflow graph is a specific implementation of the user-specified functions listed in the syntax tree associated with the high-level language in which the user writes his or her algorithms.) In one example, the analyzer module identifies all operators and vector operands within the source code 22. The analyzer module 26 then uses the identified operators and vector operands to determine the order and dependencies of the procedures or operations that are required by the source code 22. In another example, the analyzer module may classify the methods and/or functions of the user-defined algorithm into worker methods and feature extraction methods.

Once the order and dependencies of the source code 22 are determined by the analyzer module 26, that information is provided to the mapper module 28. In one example, a mapper module 28 includes software that automatically generates a mapping of the necessary gates or logic components onto the FPGA 24 to accomplish the functions required by the source code 22. The information provided by the mapper module 28 can be used with conventional field programmable gate array manufacturing processes. In another example, the mapper module 28 includes software that will generate hardware specifications corresponding to the worker methods, and hardware specifications and software corresponding to the feature extraction methods.

The analyzer module 26 and mapper module 28 preferably operate given a selected overall vector processing architecture for the FPGA 24. A variety of vector processing architectures are known for handling information such as digital images. In the digital image processing field, example architectures include a parallel array processor, a raster sub-array processor, a pipeline raster sub-array processor and a multi-pipeline raster sub-array processor. In one variation, a user of the system performs some preliminary analysis of target application constraints 22 to make a determination of which architecture will be chosen to guide the mapper module 28 at automatically developing and arranging the logic components for the FPGA 24.

Figure 2:
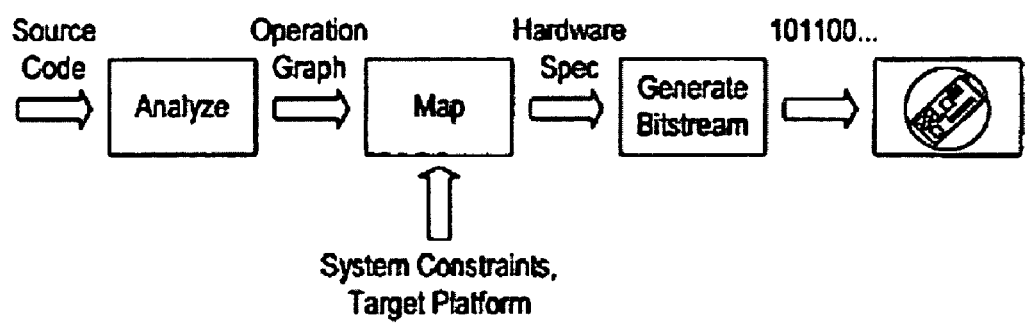

As shown in FIG. 2, the method of the preferred embodiment includes receiving a user design for a particular processing job, which consists of a software program in source code form that references a variety of separate image functions, and from the resulting hardware specification, automatically generating the necessary bit stream in order to program a desired or target field programmable gate array (FPGA) board.

In Step 1, the user writes software that implements the overall desired functionality of an embedded system. Some portion of the software includes an algorithm specifying the desired image processing operations to be performed, which have been selected by a user from a suitable library of functions, such as the image class functions. The image class libraries implement standard functions, including Boolean functions and neighborhood morphological functions and various gray scale functions and binary functions. The processing steps of those functions are well-known in the art of digital image analysis. Preferably, the user writes his program in C++ or some other source code which the software of the invention can understand and analyze.

Step 2 functions to automatically analyze the runtime behavior of the user program in order to produce an operation data flow graph. In other words, this analyzer will construct a sequence and timing diagram known in the art as an operation data flow graph from which all necessary image processing and mathematical operations can be readily identified and extracted. This run time behavior data is collected and along with the operation data flow graph is then presented to the mapper.

Step 3 functions to take the desired image processing operations specified in the user program and maps them into suitable hardware structures which can be used by the target FPGA and its bit stream software to generate the programmed FPGA. Among other things, the mapper will look for timing delays and other kinds of problems or limitations that constrain which kind of hardware structures may be used to implement the operations.

Step 4 functions to generate a bit stream for the FPGA, preferably feeding the output of the mapper to a conventional bit stream generator, which takes a low-level source or input file containing configuration, routing and location as its input and generates a machine-language binary output or bitstream used to program the target FPGA. In other words, all of the connections that must be programmed into the FPGA to implement the user-designed or user-selected algorithm are provided in the specifications found in the low-level output of the mapper module, which may be conveniently stored in a single file. Preferably, the output of the mapper module is low-level user-readable source code of the type normally provided to a conventional bit stream generator.

The mapper preferably has a variety of inputs. These include system constraints, which basically means how fast the image processing system must run in real-time to analyze the image stream in a timely manner, and a target platform constraint, which references the specific FPGA that will be used as well as some secondary issues such as I/O performance associated with that FPGA. In addition, there is preferably an architectural platform constraint that refers to the specific setup and limitations of the various hardware (circuitry) components, which are provided on the printed circuit board that the FPGA is mounted on. Preferably, this printed circuit board (PCB) or card is provided by Pixel Velocity and represents normal design specifications, for the most part with respect to tying into and using a FPGA. One other possible user input would refer to a pre-designed FPGA hardware logic framework within which the custom image processing algorithm is embedded. Such a framework would include placement and routing information for other hardware support logic such as image sensor input interfaces, internal microprocessors and internal microprocessor bus interfaces. The pre-designed framework would leave an uncommitted area of the FPGA available for the mapper to place hardware logic.

In the simplest case, the target platform and the architectural platform refer to a single FPGA and a single PCB. In practice, particularly with more complicated image processing sequences that are to be put into a hardware form using FPGAs, multiple cards in a stack may be used, with each card having a FPGA in it.

Preferably, the software package of the present invention includes a certain sets of rules or constraints for selecting suitable layouts when certain types of logic components are specified by the user. In this regard, it is well-known that various digital imaging functions, arithmetic functions, and Boolean functions, when implemented in a specific architecture, and/or when specified with a certain number of inputs, outputs and/or partial products will predictably require certain amounts of available floor space for internal use and for expected interconnections. In other words, for each class of logic components and for each size of logic component within that class, there are well-known sets of rules which dictate the minimum required floor space that it is considered safe to provide for connecting such logic components to other logic components and/or to known input or output connection points on a target FPGA for a given style of architecture.

All routing and placement programs used in FPGA development and programming systems employ such sets of rules. At times, the rules are dictated by obvious hard constraints, and sometimes they are dictated by the practical experience and/or testing and/or simulations of those involved in the FPGA design and development field, particularly those who evaluate the efficacy of and problems occasionally encountered or associated with known placement and routing programs and procedures. In any event, when a given logic component is used, the mapper module not only knows its actual size, but it also is able to make use of the sets of rules associated with specific logic components and specific input and output connections to determine how much space should be reserved in each direction around the component for the inputs and outputs of the component. Such data may be known from lookup tables relating to pre-specified (that is, pre-designed) layouts and designs for a given logic component. Such data may also be determined, using parametric tools that scale the size of exemplary logic components based upon, for example, the number of bits or lines being processed simultaneously.

The elaboration process preferably breaks down the user specified design into its various logical or image operations, including suitable hardware components for each image operator. The selection of the image operator will be customized based upon both the throughput requirement and the number of bits per pixel, that is the number of bits being processed per pixel. So, if the cycle clock is slow enough, it is possible to subdivide that cycle clock perhaps into 9 or 12 subdivisions and perform on the platform a sequence of separate operations, one occurring during each subdivision. For example, a known 3×3 neighborhood process (such as an erosion) may require 9 or 10 clock subdivisions in order to produce one operational result. However, if the pixel clock is faster such that only 3 subdivisions are possible, then this 3×3 neighborhood process, which requires 9 subdivisions, will have to be separated out into three sections and spread out in the design space so that these sets of those operations can be performed in parallel. This will require use of more hardware components (floor space) in order to realize the implementation of this operator within one pixel clock cycle. In one variation of the method of the present invention, the most area-efficient alternative is chosen automatically. This preferably results in maximum utilization of the available components and available interconnections within the target FPGA.

The method of the invention is preferably implemented largely or entirely in software and operates as an efficient and reliable compiler of user-specified algorithms. The method preferably selects pre-designed blocks of hardware components that already have been tested and proven reliable through use in other designs and/or through benchmark testing or simulation studies. Alternatively, given the image pixel size, it may be necessary to parametrically generate a specific hardware block such as a particular scalable design, to perform to a specific operator for given number of inputs, outputs, partial-products or cross-products. The method may be arranged to accommodate both the pre-specified and/or pre-programmed components and the parametrically-scaled components. With regard to the parametrically generated blocks, the easiest to implement are the logical or arithmetic operators, since these can be readily expanded or scaled up or down to handle a larger or smaller pixel size.

One benefit of using pre-designed blocks is that they use a known amount of real estate on the switch matrix and within the CLB. The unused connections are also known, and thus can be used for the interconnection of various hardware components implementing different operators. Accordingly, the pre-designed operator block (implemented as selected hardware components) uses a known amount of real estate, and leaves identifiable route or gate connections available for interconnecting the different operators which have been laid out onto a given FPGA floor plan space.

Preferably, the mapping of the specific components required to implement an operator are performed first. These hardware components are placed on the available real estate first, with each one being a unified block that need not be and preferably is not entered by other connectors. In other words, those hardware components associated with a pre-designed image-processing operator only need have inputs and outputs connected to it. Accordingly, in a given image-processing situation, once the hardware components for the different operations have been laid out, all that is left is to connect the input and outputs from the different blocks. In a typical reasonable complex image processing sequence, there may be 50 or 60 hardware components that need to be connected. But this is a much smaller task than connecting tens of thousands of separate gates, which the typical Xilinx local routing compiler attempts to do. In this manner, all field routing on the FPGA is constrained in an organized manner, first within given hardware operators; second, within a string of sequential image processing steps or operations; third, between sequences of concurrent or parallel image processing streams (i.e., partial products) that are to be presented simultaneously and at the proper time to a subsequent hardware operator; and fourth, to system's inputs and outputs, which are provided for in pre-specified locations. These pre-specified locations may be input-output pins on the FPGA, or internal logic elements within the FPGA itself when a pre-defined hardware logic framework is used. This rigorous approach may have some built-in space utilization inefficiencies associated with it. However, it has three distinct benefits. The first is that hardware blocks that are known to work flawlessly (that is without glitches and without suspect timing issues) are used. The second is that the sequential subsections are also put together in a simple usually serpentine fashion, and also work flawlessly. Third, any pre-defined hardware logic framework within which the algorithm is embedded can be pre-verified and locked in place such that it is known to function correctly on its own. Fourth, and most importantly, the remaining interconnections which need to be made yield or devolve into a much simpler set of resulting connections that need to be made amongst the strings of sequential operator blocks and overall framework inputs and outputs. Preferably, the best floor plan is determined. The best floor plan is preferably the floor plan which implements all required image processing operations of the users specified job, while leaving the most available real estate open for still further connections which can be made if necessary. In this manner, the compiler optimizes real estate at the operations level and generally succeeds in using space relatively effectively. This is not to say that a human being using traditional tools who spent months and months trying to optimize space would not come up with a more elegant architecture with less wasted space. However, the design tradeoff here is deemed well worth it, by automating the partitioning process, the typical two or three man-months required to optimize all of the required connections is now reduced down to the order of minutes or seconds, even for operations spanning multiple FPGAs.

Figure 3:
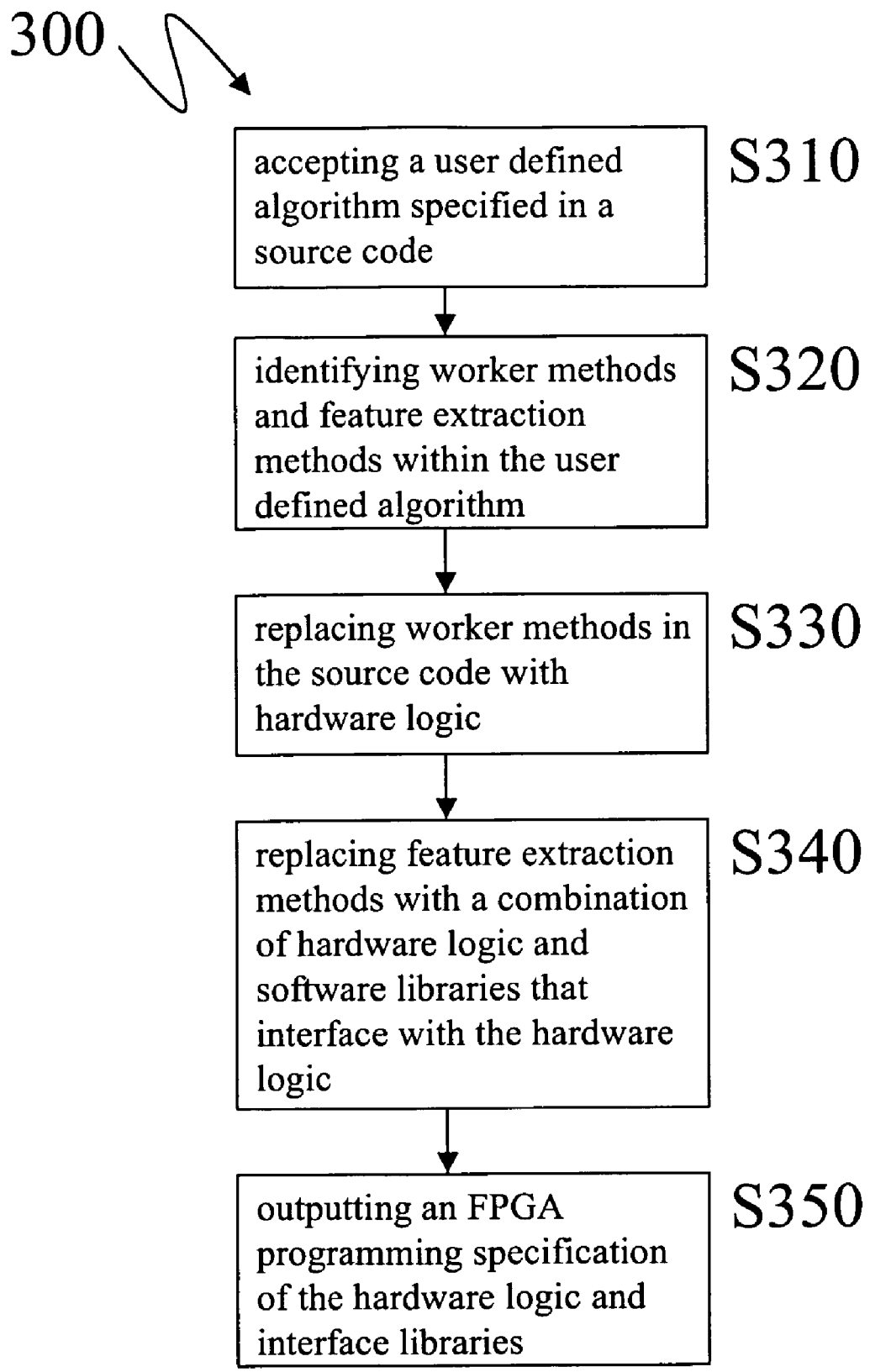
FIG. 3 is a flowchart representation of the preferred embodiment of the invention.

As shown in FIG. 3, a method 300 of partitioning an algorithm between hardware and software includes accepting a user defined algorithm specified in a source code S310, identifying worker methods and feature extraction methods within the user defined algorithm S320, replacing worker methods in the source code with hardware logic S330, replacing feature extraction methods with a combination of hardware logic and software libraries that interface with the hardware logic S340, and outputting an FPGA programming specification of the hardware logic and interface libraries S350.

Step S310, which recites accepting a user defined algorithm specified in a source code, functions to accept an algorithm, preferably written in a high level language, more preferably C++, but alternatively any programming language or source code may be used. In one embodiment, the step further includes checking the source code for syntax errors or other errors that may be detected by a standard compiler for the programming language that the source code is specified in. The user-defined algorithm is preferably tested with test data or alternatively grabbed data. In one variation, the embedded target machine may be used as an image acquisition device. This would allow image collection to occur under the same conditions as eventual deployment, thus providing test image data that would be fully representative of the eventual operational environment.

Step S320, which recites identifying worker methods and feature extraction methods within the user defined algorithm, functions to classify the methods specified in the source code as either worker methods or feature extraction methods. This is preferably performed in an analyzer, as mentioned above. Worker methods are resource intensive, typically computationally intensive functions such as image processing, and require significant processing time if performed in software. Feature extraction methods extract features from the worker methods and/or perform simple numerical operations on the extracted data, and typically do not require significant processing time if performed in software.

Step S330, replacing worker methods in the source code with hardware logic, functions to replace the worker methods with hardware logic such that the worker method operations may be performed much faster in the hardware logic than in the software, more preferably the hardware logic performs the resource intensive calculations of the worker methods in real-time or faster than real-time. This step is preferably performed in the mapper, as mentioned above. The worker methods are preferably stubbed out in the software. Linking to a different library allows the top level of the algorithm to remain unchanged, while the actual implementation of the library functions is altered. In the case of an image processing function, instead of executing (for example) a doubly nested loop to calculate a function at every pixel of an image, the function called would instead return immediately without actually doing any work (the code has been stubbed out). The actual work of the function is instead carried out completely in hardware. Following the same example, if the worker methods are image processing methods, the image processing functions can be "stubbed out" (in the software) because they only feed other image processing or feature extraction functions and don't return any data to the caller, and the hardware logic will perform the same function but much faster. During offline development (using test files, sample data, or pregrabbed data), an algorithm executes once for each image stored in a sequence of files. Embedded real-time execution runs the same software algorithm using a microprocessor that is embedded in the FPGA itself. Preferably, instead of carrying out the image processing operations (or other suitable worker methods) using software, which would be relatively slow, the "stubbed out" functions are called, which are extremely fast. This speed-up allows the software to execute the algorithm fast enough to run in real time, and keep up with frame rates that may be useful for video applications. The output of the Step S330 is preferably low-level user-readable source code of the type normally provided to a conventional FPGA bit stream generator.

Step S340, which recites replacing feature extraction methods with a combination of hardware logic and software libraries that interface with the hardware logic, functions to replace the feature extraction methods with hardware logic that extracts the feature and interfaces with the software libraries, further allowing the feature extraction methods to operate in real-time or faster than real-time. This step is preferably performed in the mapper, as mentioned above. In the preferred embodiment, the feature extraction methods operate on images, but produce symbolic information. Feature extraction functions are preferably not stubbed out (since they must return data). Instead, feature extraction functions in the real time embedded library interact with feature extraction hardware blocks to retrieve data as it becomes available. Some examples of feature extraction data are: histograms of image pixel values, lists of image coordinate/value pairs, counts of pixels having a specific value, lists of features, lists of feature locations, lists of maximum and minimum values, and lists of minimum and maximum value locations. For example, in a pupilometry application, the user-defined algorithm may calculate the diameter of the pupil and the x,y location of its center, or any other suitable data feature that may be extracted. Suppose the user-defined algorithm reduces an image of an eye to a binary image containing is marking pixels found to lie within the pupil area. An appropriate hardware feature extractor in this case would be one that produced a list of all x,y coordinate pairs of pixels whose value was 1. This list, in turn may be read by the feature extraction software function to produce the desired pupil center and diameter results. The feature extraction process is faster because the image does not need to be scanned in software to locate the pixels of interest. The output of the Step S340 is preferably low-level user-readable source code of the type normally provided to a conventional FPGA bit stream generator.

Step S350, which recites outputting an FPGA programming specification of the hardware logic and interface libraries, functions to output a specification to program an FPGA to contain the hardware logic necessary to perform the functions of the user specified algorithm. The FPGA programming specification is preferably a low-level source or input file containing configuration, routing and location. A machine-language binary output or bitstream is preferably generated from the programming specification and is used to program the target FPGA. In other words, all necessary connections that must be programmed into the FPGA in order to implement the user-designed or user-selected algorithm are provided in the specifications found in the low-level output programming specification. The user's original, unmodified software is then re-linked with the new interface libraries and loaded into the FPGA for embedded real-time software execution.

As a person skilled in the art will recognize from the previous detailed description and from the figures and claims, modifications and changes can be made to the preferred embodiments of the invention without departing from the scope of this invention defined in the following claims.

I claim:

1. A computer program product for partitioning an algorithm between hardware and software comprising:
    a computer readable storage medium having computer readable program code embodied therewith, the computer readable program code comprising:
    computer readable program code to accept a user defined algorithm specified in a source code;
    computer readable program code to identify worker methods and feature extraction methods within the user defined algorithm, wherein the feature extraction methods comprise methods selected from the group consisting of: generating histograms of image pixel values, listing image coordinate/value pairs, counting pixels having a specific value, listing features, listing feature locations, listing maximum and minimum values, listing minimum and maximum value locations;
    computer readable program code to replace worker methods in the source code with hardware logic;
    computer readable program code to replace feature extraction methods with a combination of hardware logic and software libraries that interface with the hardware logic;
    computer readable program code to output an FPGA programming specification of the hardware logic and interface libraries; and
    computer readable program code to program an FPGA in response to the FPGA programming specification.

2. The computer program product of claim 1, wherein the source code is specified in a high level programming language.

3. The computer program product of claim 1, wherein the source code is specified in C++.

4. The computer program product of claim 1, wherein the identifying step includes parsing the source code.

5. The computer program product of claim 1, wherein the worker methods are image processing methods.

6. The computer program product of claim 1, wherein the computer readable program code to replace worker methods comprises computer readable program code to stub out the source code that corresponds to the worker methods.

7. The computer program product of claim 1, wherein the feature extraction methods output symbolic information.

8. The computer program product of claim 1, wherein the interface libraries are real-time embedded libraries.

9. The computer program product of claim 8, wherein the real-time embedded libraries retrieve data from the hardware logic.

10. The computer program product of claim 9, wherein the input data set is collected under the same conditions as deployment.

11. The computer program product of claim 10, wherein the input data set is collected using an embedded target machine.

12. The computer program product of claim 1, further comprising computer readable program code to test the software program with an input data set.

13. The computer program product of claim 1, wherein the FPGA programming specification is in a vendor specific low-level format.

14. The computer program product of claim 1, wherein the FPGA programming specification is a hardware gate programming bitstream.

15. A computer implemented method of programming a field programmable gate array (FPGA) with an algorithm by partitioning the algorithm between hardware and software, the method comprising:

accepting a user defined algorithm specified in source code;
identifying, by an analyzer module, worker methods and feature extraction methods within the user defined algorithm;
replacing, by a mapper module, worker methods in the source code with hardware logic;
replacing, by the mapper module, feature extraction methods with a combination of hardware logic and software libraries that interface with the hardware logic, wherein the feature extraction methods comprise methods selected from the group consisting of: generating histograms of image pixel values, listing image coordinate/value pairs, counting pixels having a specific value, listing features, listing feature locations, listing maximum and minimum values, listing minimum and maximum value locations;
generating a FPGA programming specification of the hardware logic and interface libraries; and
programming at least one target FPGA using the FPGA programming specification.

16. The method of claim 15, wherein hardware logic includes hardware component mappings and wherein the step of programming at least one target FPGA includes mapping the hardware components on the FPGA.

* * * * *